United States Patent
Fisher et al.

(10) Patent No.: US 11,745,228 B2
(45) Date of Patent: Sep. 5, 2023

(54) AIR KNIFE SYSTEMS

(71) Applicant: Hamilton Sundstrand Corporation, Charlotte, NC (US)

(72) Inventors: Brian A. Fisher, West Hartford, CT (US); David W. Morganson, Marlborough, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 186 days.

(21) Appl. No.: 16/593,727

(22) Filed: Oct. 4, 2019

(65) Prior Publication Data
US 2021/0101186 A1    Apr. 8, 2021

(51) Int. Cl.
| | |
|---|---|
| *B08B 5/02* | (2006.01) |
| *B29C 64/20* | (2017.01) |
| *B33Y 30/00* | (2015.01) |
| *B33Y 10/00* | (2015.01) |
| *B29C 64/10* | (2017.01) |

(52) U.S. Cl.
CPC ............... *B08B 5/02* (2013.01); *B29C 64/20* (2017.08); *B33Y 10/00* (2014.12); *B29C 64/10* (2017.08); *B33Y 30/00* (2014.12)

(58) Field of Classification Search
CPC ..... B29C 64/153; B29C 64/236; B29C 64/35; B08B 5/02; F26B 21/004
See application file for complete search history.

(56) References Cited

U.S. PATENT DOCUMENTS

| | | | |
|---|---|---|---|
| 3,215,350 A | * | 11/1965 | Hetrick ................... B05B 1/005 239/150 |
| 5,386,500 A | * | 1/1995 | Pomerantz ............. B33Y 40/20 264/401 |
| 6,215,093 B1 | | 4/2001 | Meiners et al. |
| 10,189,057 B2 | | 1/2019 | Craft et al. |
| 10,252,333 B2 | | 4/2019 | McMurtry et al. |

(Continued)

FOREIGN PATENT DOCUMENTS

| | | |
|---|---|---|
| DE | 102013215377 A1 | 2/2015 |
| DE | 102014209161 A1 | 11/2015 |

(Continued)

OTHER PUBLICATIONS

Extended European Search Report dated Apr. 28, 2020, issued during the prosecution of European Patent Application No. EP 19215268.4.

*Primary Examiner* — Joseph S Del Sole
*Assistant Examiner* — Ariella Machness
(74) *Attorney, Agent, or Firm* — Locke Lord LLP; Daniel J. Fiorello; Gabrielle L. Gelozin

(57) ABSTRACT

A gas knife system for an additive manufacturing system can include one or more gas delivery members configured to move relative to a build area of the additive manufacturing system, and an inlet conduit configured to supply gas to the one or more gas delivery members while the one or more gas delivery members are moved relative to the build area. The system can also include one or more gas collection members configured to move relative to the build area of the additive manufacturing system, and an outlet conduit configured collect gas from the one or more gas collection members while the one or more gas collection members move relative to the build area.

14 Claims, 2 Drawing Sheets

(56) References Cited

U.S. PATENT DOCUMENTS

| | | | |
|---|---|---|---|
| 2016/0136731 A1* | 5/2016 | Mcmurtry | B29C 64/153 |
| | | | 419/53 |
| 2017/0072468 A1* | 3/2017 | Schilling | B28B 1/001 |
| 2017/0120330 A1 | 5/2017 | Sutcliffe et al. | |
| 2019/0322051 A1* | 10/2019 | Wakelam | B33Y 30/00 |
| 2019/0366434 A1* | 12/2019 | Upadhye | B22F 12/13 |

FOREIGN PATENT DOCUMENTS

| | | |
|---|---|---|
| JP | 2018003148 A | 1/2018 |
| WO | 2014199150 | 12/2014 |
| WO | 2017179001 | 10/2017 |

\* cited by examiner

AIR KNIFE SYSTEMS

FIELD

This disclosure relates to additive manufacturing systems, more specifically to gas knife systems for additive manufacturing machines.

BACKGROUND

Metal additive manufactured (AM) components are composed of a very long series of very small weld beads. Each weld bead produces waste products in the form of oxidized particles and vaporized metal (which can be referred to as "deposition products"). These deposition products can cause defects in the final part. Current technologies remove these deposition products with a stationary air knife, but this method is less effective with increasing build plate sizes used for cost effective production.

Such conventional methods and systems have generally been considered satisfactory for their intended purpose. However, there is still a need in the art for improved gas knife systems.

The present disclosure provides a solution for this need.

SUMMARY

In accordance with at least one aspect of this disclosure, a gas knife system for an additive manufacturing system can include one or more gas delivery members configured to move relative to a build area of the additive manufacturing system, and an inlet conduit configured to supply gas to the one or more gas delivery members while the one or more gas delivery members are moved relative to the build area. The system can also include one or more gas collection members configured to move relative to the build area of the additive manufacturing system, and an outlet conduit configured collect gas from the one or more gas collection members while the one or more gas collection members move relative to the build area.

In accordance with at least one aspect of this disclosure, a gas knife system for an additive manufacturing system can include one or more rails configured to be disposed in an additive manufacturing system and/or forming part of the additive manufacturing system. The system can include an inlet manifold configured to extend over a build area and configured to be moveably mounted to the one or more rails to move relative to the build area, and an outlet manifold configured to extend over the build area and configured to be moveably mounted to the one or more rails to move relative to the build area.

The inlet manifold and the outlet manifold can be configured to extend across an entire width of the build area. The one or more rails can include two rails configured to be on opposite sides of the build area, wherein the inlet manifold and the outlet manifold are configured to slide on the two rails.

The inlet manifold and the outlet manifold can be fixed in position relative to each other such that the inlet manifold and the outlet manifold slide together and maintain a constant distance apart. In certain embodiments, the inlet manifold and the outlet manifold are positioned parallel relative to each other.

The inlet manifold and/or the outlet manifold can have a flat shape with a high aspect ratio. The inlet manifold and/or the outlet manifold can include an internal channel defined therein and in fluid communication with a lateral opening on a lateral end of the inlet manifold and/or outlet manifold.

The inlet manifold and/or the outlet manifold can include a slot opening sized to extend across an entire width of the build area in fluid communication with the internal channel. The inlet manifold and/or the outlet manifold can be angled downward toward the build area such that each slot opening is positioned closer to the build area than an opposite side of the respective manifold. In certain embodiments, the inlet manifold and/or outlet manifold include at least one of a spatter shield extending at least partially upward from an upper surface of the inlet and/or outlet manifold. The inlet manifold and/or the outlet manifold can include a lip extending from a bottom surface of the inlet manifold and/or outlet manifold beyond the spatter shield toward the build area.

A recirculation system can be connected to each lateral end of each of the inlet manifold and output manifold to be in fluid communication with each lateral opening of the inlet manifold and outlet manifold to input flow to the output manifold and receive return flow from the inlet manifold. The recirculation system can be connected to each lateral end of each manifold with a flexible hose to allow the manifolds to move relative to the recirculation system.

In certain embodiments, the system can include a control module configured to position the inlet manifold and the outlet manifold relative to a location of a melt pool. The control module can be configured to position the inlet manifold and the outlet manifold such that the melt pool is at a medial point between the inlet manifold and the outlet manifold. The control module can be configured to move the inlet manifold and the outlet manifold to follow movement of the melt pool. The control module can include any suitable hardware and/or software module(s).

In accordance with at least one aspect of this disclosure, an additive manufacturing system can include a build area, and a gas knife system as disclosed herein, e.g., as described above. Any other suitable components (e.g., a laser system, powder recoater system or any other suitable material deposition system) are contemplated herein.

In accordance with at least one aspect of this disclosure, a method can include collecting spatter during an additive manufacturing operation using a moveable gas knife system. The method can include any other suitable method(s) and/or portion(s) thereof is contemplated herein.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
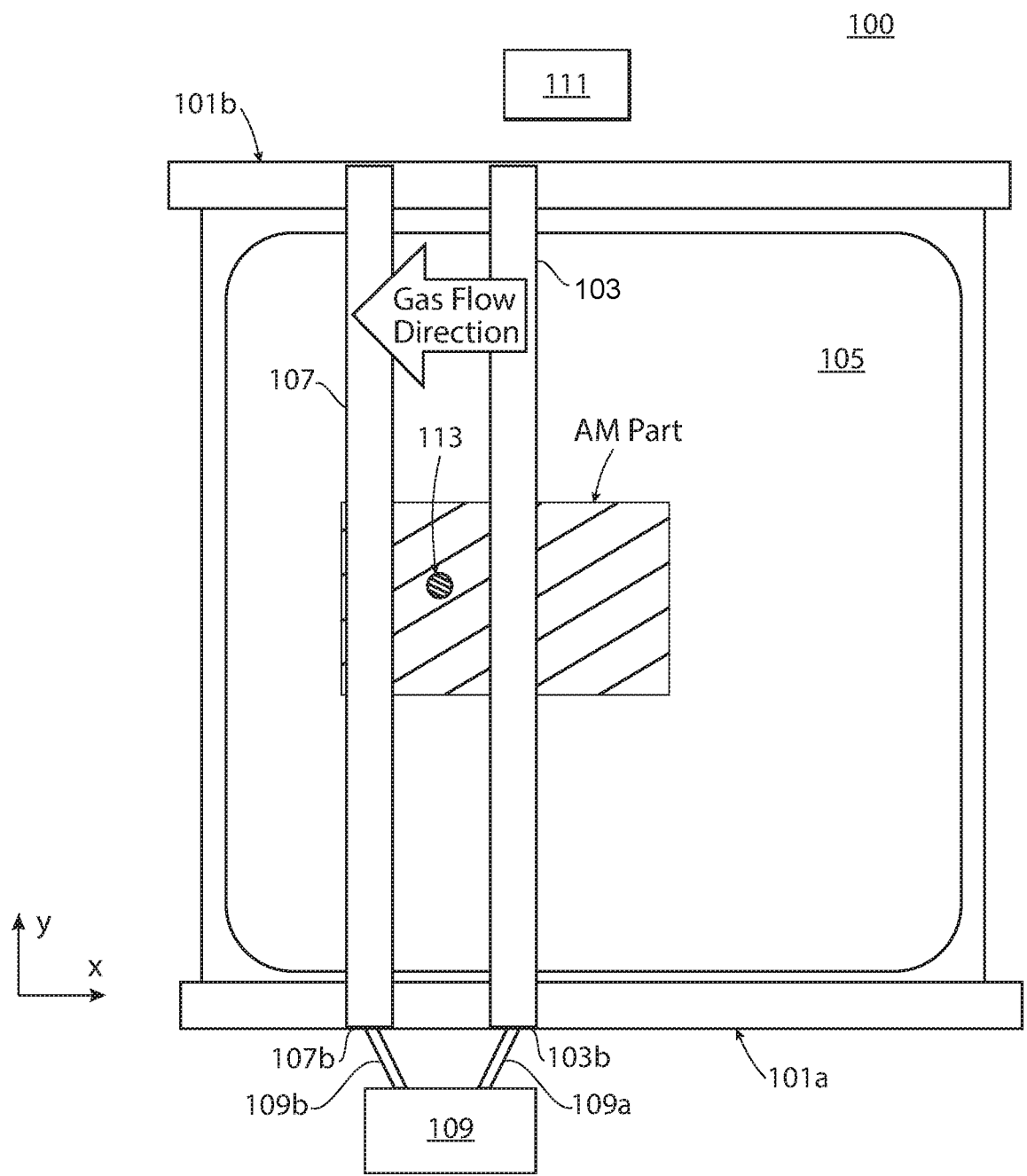
FIG. 1 is a schematic plan view of an embodiment of a system in accordance with this disclosure.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. Other embodiments and/or aspects of this disclosure are shown in FIG. 2.

Figure 2:
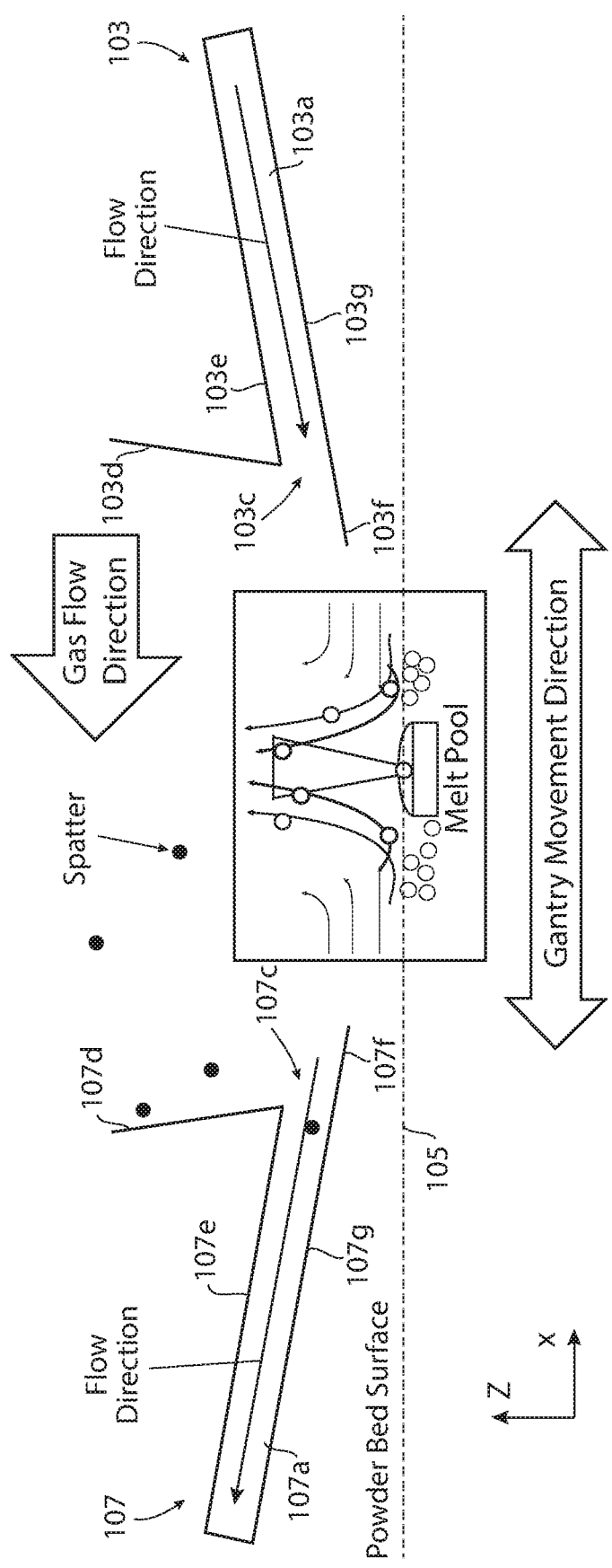
FIG. 2 is a cross-sectional view of the embodiment of FIG. 1.

Referring to FIGS. 1 and 2, a gas knife system 100 (e.g., an air knife system) for an additive manufacturing system (e.g., as shown in FIG. 1) can include one or more rails 101a, 101b configured to be disposed in an additive manufacturing system (e.g., dimensioned to fit within a housing of an additive manufacturing machine) and/or forming part of the additive manufacturing system (e.g., integral formed in a housing of an additively manufacturing system). The system 100 can include an inlet manifold 103 configured to extend over a build area 105 (e.g., a build plate within an additive manufacturing system) and configured to be moveably (e.g., slideably) mounted to the one or more rails 101a, 101b to move relative to the build area 105. The system 100 can include an outlet manifold 107 configured to extend over the build area 105 and configured to be moveably mounted to the one or more rails 101a, 101b to move relative to the build area 105.

Any suitable motor system (e.g., any suitable belt drive system as appreciated by those having ordinary skill in the art in view of this disclosure) configured to allow the inlet manifold 103 and the outlet manifold 107 to move on the rails 101a, 101b is contemplated herein. For example, a gantry motor system can be used. Any motive system to move the manifolds 103, 107 relative to the rails 101a, 101b, whether together with the other manifold or each manifold independently, is contemplated herein.

The inlet manifold 103 and the outlet manifold 107 can be configured to extend across an entire width of the build area 105, e.g., as shown. The one or more rails 101a, 101b can include two rails 101a, 101b, e.g., as shown configured to be on opposite sides of the build area 105. The inlet manifold 103 and the outlet manifold 107 are configured to slide on the two rails 101a, 101b.

The inlet manifold 103 and the outlet manifold 107 can be fixed in position relative to each other such that the inlet manifold 103 and the outlet manifold 107 slide together and maintain a constant distance apart. In certain embodiments, the inlet manifold 103 and the outlet manifold 107 are positioned parallel relative to each other, e.g., as shown.

The inlet manifold 103 and/or the outlet manifold 107 can have a flat shape with a high aspect ratio (e.g., long and thin with a small width as shown). As shown in FIG. 2, the inlet manifold 103 and/or the outlet manifold 107 can include an internal channel 103a, 107a defined therein and in fluid communication with a lateral opening 103b, 107b on a lateral end of the inlet manifold 103 and/or outlet manifold 107.

The inlet manifold 103 and/or the outlet manifold 107 can include a slot opening 103c, 107c sized to extend across an entire width of the build area 105 in fluid communication with the internal channel 103a, 107a. Any other suitable type of opening (e.g., a series of holes) and/or size of the slot opening 103c, 107c is contemplated herein. The inlet manifold 103 and/or the outlet manifold 107 can be angled downward toward the build area 105, e.g., as shown in FIG. 2, such that the respective slot opening 103c, 107c is positioned closer to the build area 105 than an opposite side of the respective manifold 103, 107c.

In certain embodiments, the inlet manifold 103 and/or outlet manifold 107 include at least one of a spatter shield 103d, 107d extending at least partially upward from an upper surface 103e, 107e of the inlet and/or outlet manifold 103, 107. It is contemplated that the spatter shield 103d and/or 107d can be a solid material (e.g., sheet metal). However, embodiments of a spatter shield 103d, 107d need not be a solid object. Embodiments of a spatter shield 103d and/or 107d can include multiple flow sources/sinks connected thereto and/or a porous wall and/or any other suitable means to direct gas flow such that the velocity at different heights can be tailored.

The inlet manifold 103 and/or the outlet manifold 107 can include a lip 103f, 107f extending from a bottom surface 103g, 107g of the inlet manifold 103 and/or outlet manifold 107 beyond the spatter shield 103d, 107d toward the build area 105. The lip 103f and/or 107f can be a solid piece of material (e.g., sheet metal) and/or any other suitable material.

The inlet manifold 103 and the outlet manifold 107 can be the same (e.g., positioned mirrored to each other), e.g., as shown. However, it is contemplated that the inlet manifold 103 and the outlet manifold 107 can different in suitable manner, e.g., different shapes and/or channels and/or openings, different features, e.g., inlet manifold 103 with spatter shield 103d and/or lip 103f and outlet manifold without one or both, or any other suitable difference.

A recirculation system 109, e.g., closed loop, can be connected to each lateral end of each of the inlet manifold 103 and output manifold 107 to be in fluid communication with each lateral opening 103b, 107b of the inlet manifold 103 and outlet manifold 107 to input flow to the output manifold 107 and receive return flow from the inlet manifold 103. The recirculation system 109 can be connected to each lateral end of each manifold 103, 107, e.g., as shown, with a flexible hose 109a, 109b to allow the manifolds 103, 107 to move relative to the recirculation system 109. Any other suitable connection type and/or position thereof to connect to the manifolds 103, 107 is contemplated herein.

In certain embodiments, the system 100 can include a control module 111 configured to position the inlet manifold 103 and the outlet manifold 107 relative to a location of a melt pool 113. The control module 111 can be configured to position the inlet manifold 103 and the outlet manifold 107 such that the melt pool 113 is at a medial point between the inlet manifold 103 and the outlet manifold 107, e.g., as shown. The control module 111 can be configured to move the inlet manifold 103 and the outlet manifold 107 to follow movement of the melt pool 113. Any other suitable function for the control module 111 is contemplated herein. The control module 111 can include any suitable hardware and/or software module(s).

The control module 111 can form part of and/or be integrated with an additive manufacturing system controller, however, the control module 111 can be separate or part of any other suitable system. In certain embodiments, the control module 111 can receive a position of the melt pool 113 from the additive manufacturing system controller. Certain embodiments of a control module 111 can constantly move one or more of the manifolds 103, 107, e.g., to keep the laser spot in a fixed position (e.g., centered or at some other optimal location in the left-right direction as shown) by moving a gantry. Certain embodiments can fix one or both of the manifolds 103, 107 position for a portion of build process as long as the laser spot/melt pool is within the space between the manifolds 103, 107.

In accordance with at least one aspect of this disclosure, an additive manufacturing system can include a build area 113, and a gas knife system, e.g., 100, as disclosed herein, e.g., as described above. Any other suitable components (e.g., a laser system, a powder recoater system or any other suitable material deposition system) are contemplated herein.

In accordance with at least one aspect of this disclosure, certain embodiment of a gas knife system for an additive manufacturing system can include one or more gas delivery members (e.g., inlet manifold 103 described above) configured to move relative to a build area of the additive manufacturing system, and an inlet conduit (e.g., hose 109*a* described above) configured to supply gas to the one or more gas delivery members while the one or more gas delivery members are moved relative to the build area. Such an embodiment can also include one or more gas collection members (e.g. outlet manifold 107 as described above) configured to move relative to the build area of the additive manufacturing system, and an outlet conduit (e.g., hose 109*b* as described above) configured collect gas from the one or more gas collection members while the one or more gas collection members move relative to the build area.

In accordance with at least one aspect of this disclosure, a method can include collecting spatter during an additive manufacturing operation using a moveable gas knife system. The method can include any other suitable method(s) and/or portion(s) thereof is contemplated herein.

Certain embodiments can include an independent gantry system, e.g., using two strip shaped manifolds on rails that can move in a one dimension to follow where the melt pool is. Certain embodiments can be configured to maintain laminar flow at all times, e.g., by controlling a space between the manifolds to be within a laminar distance (e.g., about 100 mm or less). Certain embodiments can take data from a laser system to position the laser spot and the melt pool in the middle of space between the manifolds.

Embodiments can include rails integrated into a wall, floor, or ceiling, of a chamber of an additive manufacturing machine. Embodiments can include a spatter shield extending upward on outlet nozzle, for example. Embodiments can include a lip (e.g., scoop shaped or straight) to prevent spatter from landing on the build area.

In current systems, global gas flow direction generally acts 5-25 mm above the powder bed at a velocity of roughly 2-3 m/s, and is used to carry away the deposition products from above the melt pool such that the laser does not get scattered by them and they do not land back onto the part. Embodiments can replace the global gas flow across the whole plate with a similar gas flow profile sitting much closer to where melting is occurring.

Traditional stationary gas knife systems only work over a limited distance. Embodiments include a gantry system and mechanism to generate local gas flow across a limited distance local to the melt pool. Embodiments can be moved around the build plate to cover the entire build area and can work for multiple lasers, eliminating the maximum build size threshold imposed by current gas flow technologies. One side of the system can have a gas jet from the inlet manifold, and the other would have suction in the outlet manifold, which can be part of a closed loop blower system.

Efficient removal of deposition products generates parts with less defects. Embodiments allow a higher quality build and more build area to be utilized simultaneously, reducing cost and providing capability improvements.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A gas knife system for an additive manufacturing system, comprising:
    one or more gas delivery members configured to move relative to a build area of the additive manufacturing system;
    an inlet conduit configured to supply gas to the one or more gas delivery members while the one or more gas delivery members are moved relative to the build area;
    one or more gas collection members configured to move relative to the build area of the additive manufacturing system;
    an outlet conduit configured to collect gas from the one or more gas collection members while the one or more gas collection members move relative to the build area, wherein the delivery member and the collection member are configured to extend across an entire width of the build area, wherein the delivery member and the collection member include an internal channel defined therein and in fluid communication with a lateral opening on a lateral end of the delivery member and collection member, wherein the delivery member and the collection member include a slot opening sized to extend across an entire width of the build area in fluid communication with the internal channel, wherein the delivery member and the collection member are angled downward toward the build area such that each slot opening is positioned closer to the build area than an opposite side of the respective collection member or deliver member, wherein the each of the gas delivery member and the gas collection members include a spatter shield extending at least partially upward from an upper surface of the gas delivery member and the gas collection members, respectively, and a lip extending from a bottom surface of the gas delivery member and the gas collection members, respectively, beyond the spatter shield toward the build area.

2. A gas knife system for an additive manufacturing system, comprising:
    one or more rails configured to be disposed in an additive manufacturing system and/or forming part of the additive manufacturing system;
    an inlet manifold configured to extend over a build area and configured to be moveably mounted to the one or more rails to move relative to the build area; and an outlet manifold configured to extend over the build area and configured to be moveably mounted to the one or more rails to move relative to the build area, wherein the inlet manifold and the outlet manifold are configured to extend across an entire width of the build area, wherein the inlet manifold and the outlet manifold include an internal channel defined therein and in fluid communication with a lateral opening on a lateral end of the inlet manifold and outlet manifold, wherein the inlet manifold and the outlet manifold include a slot opening sized to extend across an entire width of the build area in fluid communication with the internal channel, wherein the inlet manifold and the outlet manifold are angled downward toward the build area such that each slot opening is positioned closer to the build area than an opposite side of the respective manifold, wherein the inlet manifold includes a spatter shield extending at least partially upward from an upper surface of the inlet manifold, wherein the outlet manifold includes a lip extending from a bottom surface of the outlet manifold toward the build area, wherein the outlet manifold includes a spatter shield extending at least partially upward from an upper surface of the outlet manifold, wherein the inlet manifold includes a lip extending from a bottom surface of the inlet manifold beyond the spatter shield toward the build area.

3. The gas knife system of claim 2, wherein the one or more rails includes two rails configured to be on opposite sides of the build area, wherein the inlet manifold and the outlet manifold are configured to slide on the two rails.

4. The gas knife system of claim 3, wherein the inlet manifold and the outlet manifold are fixed in position relative to each other such that the inlet manifold and the outlet manifold slide together and maintain a constant distance apart.

5. The gas knife system of claim 4, wherein the inlet manifold and the outlet manifold are positioned parallel relative to each other.

6. The gas knife system of claim 5, wherein the inlet manifold and/or the outlet manifold have a flat shape with a high aspect ratio.

7. The gas knife system of claim 2, further comprising a recirculation system connected to each lateral end of each of the inlet manifold and output manifold to be in fluid communication with each lateral opening of the inlet manifold and outlet manifold to input flow to the output manifold and receive return flow from the inlet manifold.

8. The gas knife system of claim 7, wherein the recirculation system is connected to each lateral end of each manifold with a flexible hose to allow the manifolds to move relative to the recirculation system.

9. The gas knife system of claim 2, further comprising a control module configured to position the inlet manifold and the outlet manifold relative to a location of a melt pool.

10. The gas knife system of claim 9, wherein the control module is configured to position the inlet manifold and the outlet manifold such that the melt pool is at a medial point between the inlet manifold and the outlet manifold.

11. The gas knife system of claim 10, wherein the control module is configured to move the inlet manifold and the outlet manifold to follow movement of the melt pool.

12. The gas knife system of claim 2, further comprising the additive manufacturing system and the build area.

13. The gas knife system of claim 2, wherein the inlet manifold and the outlet manifold are configured to extend across an entire width of the build area, wherein the one or more rails includes two rails configured to be on opposite sides of the build area, wherein the inlet manifold and the outlet manifold are configured to slide on the two rails.

14. The gas knife system of claim 1, a control module configured to position the one or more gas collection members and the one or more gas delivery members relative to a location of a melt pool, wherein the control module is configured to position the one or more gas collection members and the one or more gas delivery members such that the melt pool is at a medial point between the one or more gas collection members and the one or more gas delivery members.

* * * * *